Patented June 25, 1946

2,402,870

UNITED STATES PATENT OFFICE 2,402,870

MOISTURE VAPOR-PROOFING MATERIAL

Lothian M. Burgess and Gene Abson, Chicago, Ill., assignors to H. P. Smith Paper Company, Chicago, Ill., a corporation of Illinois No Drawing. Application July 8, 1943, Serial No. 493,861

3 Claims. (Cl. 106—218)

This invention relates to new and improved heat liquefiable thermoplastic compounds or materials useful for laminating paper, cloth, regenerated cellulose films or sheets, cellulose ether or ester films, foil, and the like, to themselves or to each other in two or more plies, for the purpose of rendering such laminated sheets or films resistant to the passage of moisture in vapor or fog form.

In the packaging of various articles of commerce there arises a necessity for preserving them in their manufactured state of moisture content, both by preventing the ingress or egress of moisture. For instance, cigarettes must be prevented from losing moisture in dry climates or from absorbing too much moisture in humid atmosphere; most packaged or wrapped foods must be similarly safeguarded; likewise it is important in packaging of most types of washing powders and soaps. In addition to these types of products it is also of importance to wrap or package metallic products to prevent ingress of moisture with its attendant corrosive action.

We are aware that laminated sheets for such purposes are not new and that various materials for such purpose have been used. These materials are generally bituminous products such as tars or asphalts, various waxes either in hot-melt application or in the form of solutions in solvents or emulsions in water, with or without various modifying agents; there has also been used numerous types of lacquers in solvent solutions; there are also compounds containing film-forming materials such as ethyl cellulose dissolved in wax or wax-like bases with and without a solvent.

This present invention is directed toward a new, improved and economical moisture vapor-proofing adhesive compound composed of petrolatum, derived from petroleum oil, in combination with a resin of such character that it is compatible, that is, miscible or soluble, with the petrolatum in the proportions used, the resin being also insoluble in water and unaffected by moisture vapor, and a laminated wrapping material formed therewith.

A satisfactory hot-melt laminating compound, in addition to acting as a barrier to the passage of moisture, must also possess (1) sufficient adhesive properties to cement the sheets or films together and keep them from delaminating throughout its useful life under all conditions of climate and atmospheric temperature; (2) be capable of being applied in a heat liquefied condition without penetrating the sheets unduly and at a temperature below that which would injure the paper or film to which it is applied; (3) be of such character that it will not bleed or strike-through under heat sealing conditions of packaging; (4) be stable over a period of years so as not to lose its moisture vapor resistance or adhesiveness either by loss of volatiles, crystallization, embrittlement or molecular rearrangement; (5) be of such character that it wets and, therefore, spreads to a uniform film of controllable thickness without leaving any uncoated sections or form pinholes, bubbles or any such imperfections as would permit moisture transmission; (6) be non-toxic and free from any elements which would impart odor or taste to food products or which would tend to corrode metals or alloys; (7) be sufficiently flexible and pliable so that the folding and creasing encountered in wrapping and handling does not break film and allow the passage of moisture vapor therethrough.

Many known materials in the fields of resins, waxes and plastics possess a number of these desirable characteristics but none alone seems to possess them all.

Soft petrolatums when applied in thin films are excellent for resisting the transmission of moisture vapor, but they do not possess sufficient adhesiveness or tackiness or body to laminate paper or similar films and that they alone are so liquid when heated above the melting point that they cannot be applied to paper without almost complete impregnation. These petrolatums, or Vaseline-like materials, are petroleum products separated from reduced crude stocks, usually of the paraffinic type remaining after the wax distillate containing paraffin has been removed, by chilling, usually pre-diluting with naphtha and centrifuging or settling. They are very soft, unctuous usually dark colored products generally ranging in melting point from almost room temperature to 140° F., or 150° F., or possibly 155° F., and having a penetration at 77° F., 100 grams 5 seconds, of over 100. However, we prefer to use those which have a melting point of over about 125° F. The petrolatums are very cheap and abundant in quantity, usually considered a waste or by-product, and in many refineries frequently burned as fuel for disposal.

A typical analysis of two commercial petrolatums prepared from Mid-Continent crude oil the use of which is proposed herein is as follows:

|  | #1 | #2 |
|---|---|---|
| Penetration at 77° F., 100 grams 5 seconds. | 285 | 270. |
| Penetration at 32° F., 200 grams 1 minute. | 88 |  |
| Melting point, petrolatum method | 145° F | 126° F. |
| Physical condition | Soft and oily | Soft and oily. |

(American Society for Testing Materials methods were used in all tests.)

In order to render these petrolatums useful, it is necessary to harden them and make them adhesive. Among the best products for such purpose are the water insoluble metallic resinates such as zinc resinate and calcium resinate, both of which are one hundred per cent compatible with petrolatum. The petrolatum compatible ester gums, particularly the hydrogenated ones, the terpene condensation product resins known as Piccolytes, terpene type resins known as Durez 420 or 409, Reichhold Ester Gum P-251, Alkydol and similar resins may also be used, but they are not equal in all respects to the metallic resinates. Any of the various waxes may be added to increase fluidity if desired, or to reduce tack, if wanted, or to increase hardness.

We have found that nearly equal proportions by weight of the higher melting point resinates and, for example, a 145° F., melting point petrolatum, make excellent laminating compounds. This ratio, then, depicts that, depending upon one's point of view, the resin acts to harden the petrolatum or, conversely, that the petrolatum acts to plasticize the resin. Either contemplation satisfies the working conditions so it seems academic to speculate further. However, depending upon the viscosity and hardness desired in the final compound we may use from about 30 to about 60 parts by weight of petrolatum and from about 40 to about 70 parts of the resin.

The following examples are illustrative of our compounds, the application thereof, and the resulting products, but are not to be considered as undue limitations:

*Example 1.*—Two sheets of paper were laminated on a roll-coating machine by applying 12.5 pounds per ream of a compound composed of 45% by weight limed rosin and 55% by weight petrolatum to the underside of one of these sheets and immediately directing the other sheet into contact and passing both sheets between calender rolls and over chill rolls. The compound was applied at about 250° F., at which temperature it had a Saybolt Furol viscosity of 62 seconds. The rosin was limed with approximately 7% lime and had a melting point of about 300° F. The finished sheet showed no bleeding through of compound when tested at 140° F., for 18 hours. When tested for moisture vapor transmission in a General Foods type cabinet, it showed less than 3 grams per 100 square inches per 24 hours of M. V. T. (moisture vapor transmission) at 100° F., and 95+% relative humidity. It showed very low strike-through when tested at 275° F., for 5 seconds, simulating a commercial heat sealing operation. This laminated sheet was soft and pliable, showed no brittleness and was so well laminated that the sheets could not be pulled apart without tearing the fibres. It makes an excellent package for cigarettes and the like.

*Example 2.*—When the same compound was applied in a little heavier layer, namely 17.5 pounds per ream, it showed less than 1.5 grams M. V. T. per 24 hours per 100 square inches. It also had the same excellent laminating bond and flexibility of finished sheet.

*Example 3.*—Equal parts of limed rosin of slightly lower lime content and melting point than in Example 1, and 150° melting point petrolatum derived from Mid-Continent crude oil, showed results equal in all respects to Example 1.

*Example 4.*—55 parts of 145° F., melting point petrolatum and 45 parts of a zinc resinate known commercially as "Zirex," manufactured by the Newport Industries and having a metallic zinc content of 8.75% and a capillary melting point of about 270° F., were blended by heating and used for laminating paper, with results very similar to those figures shown in Example 1.

*Example 5.*—60 parts of a wood rosin limed with 5.6% of calcium hydrate and having a ring and ball softening point of about 280° F., was melted together with 40 parts of 146° F., melting point petrolatum. This compound had a Furol viscosity of approximately 125 seconds at 250° F. It was used in laminating paper with excellent lamination and high moisture vapor resistance.

*Example 6.*—55 parts of Zirex and 45 parts of 126° F., melting point petrolatum were melted together and used for laminating Cellophane to glassine with excellent bond and moisture vapor resistance. The compound had a Furol viscosity of 123 seconds at 250° F.

*Example 7.*—45 parts of Durez No. 420 and 55 parts of 145° F., melting point petrolatum were melted together and used as a laminating compound. When tried on paper, the strike-through was too high but the compound was a very satisfactory laminating material for glassine to glassine, Cellophane to Cellophane, cellulose acetate to glassine and similar combinations. The compound showed a Furol viscosity at 250° F., of 50 seconds. The Durez resin had a melting point of 285° F. (capillary tube method), an acid number of 40 to 50 and a specific gravity of 1.085.

*Example 8.*—65 parts of a hydrogenated ester gum which was hard and brittle at room temperature and which was 100% compatible with 35 parts of 150° F., melting point petrolatum, were liquefied and melted together. The compound had a Furol viscosity at 250° F., of 69 seconds. It was used as a laminating material for paper with excellent results, excepting high strike-through when heat sealed. However, for purposes other than heat sealable packages it was an excellent compound, showing a strong laminating bond and high moisture vapor resistance. Less ester gum increased the strike-through and less petrolatum tended toward brittleness.

*Example 9.*—20 parts of 155° F., melting point petrolatum were blended by heating with 70 parts of an hydrogenated rosin of about 160° F., ring and ball softening point. This rosin is a product of the Hercules Powder Company known as "Staybelite Resin." This compound was used in laminating Cellophane to Cellophane for increasing its moisture vapor resistance with excellent results. It is not suitable for laminating paper on account of its softness and high fluidity when heated.

*Example 10.*—40 parts of a terpene hydrocarbon condensation product sold on the market as "Piccolyte" having a melting point of about 240° F., were blended by heating with 60 parts of 144° F., melting point petrolatum and used with excellent results for laminating paper to Cellophane. The finished product showed excellent bond and moisture vaporproofness but with relatively high bleeding under high heat seal temperatures.

We claim as our invention:

1. A thermoplastic, heat liquefiable, normally tacky adhesive composition suitable for forming substantially moisture vapor-proof laminates of sheet material, said composition comprising essentially from about 30 to about 60 parts by weight of petrolatum having a melting point of not in excess of about 155° F., and a needle penetration in excess of 100 at 77° F., 100 grams 5 seconds, and from about 70 to about 40 parts by weight of a compatible hard and brittle water insoluble metallic resinate.

2. A thermoplastic, heat liquefiable, normally tacky adhesive composition suitable for forming substantially moisture vapor-proof laminates of sheet material, said composition comprising essentially from about 30 to about 60 parts by weight of petrolatum having a melting point of not in excess of about 155° F., and a needle penetration in excess of 100 at 77° F., 100 grams 5 seconds, and from about 70 to about 40 parts by weight of zinc resinate.

3. A thermoplastic, heat liquefiable, normally tacky adhesive composition suitable for forming substantially moisture vapor-proof laminates of sheet material, said composition comprising essentially from about 30 to about 60 parts by weight of petrolatum having a melting point of not in excess of about 155° F., and a needle penetration in excess of 100 at 77° F., 100 grams 5 seconds, and from about 70 to about 40 parts by weight of calcium resinate.

LOTHIAN M. BURGESS.
GENE ABSON.